(12) United States Patent
Song et al.

(10) Patent No.: US 7,588,850 B2
(45) Date of Patent: Sep. 15, 2009

(54) POLYMER MEMBRANE FOR A FUEL CELL, A METHOD OF PREPARING THE SAME, AND A MEMBRANE-ELECTRODE ASSEMBLY FUEL CELL SYSTEM COMPRISING THE SAME

(75) Inventors: Min-Kyu Song, Yongin-si (KR); Hae-Kwon Yoon, Yongin-si (KR); Young-Mi Park, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 337 days.

(21) Appl. No.: 11/474,065

(22) Filed: Jun. 23, 2006

(65) Prior Publication Data

US 2007/0015023 A1 Jan. 18, 2007

(30) Foreign Application Priority Data

Jun. 24, 2005 (KR) .................... 10-2005-0054955

(51) Int. Cl.
*H01M 8/10* (2006.01)
*B01J 40/00* (2006.01)
(52) U.S. Cl. .......................... 429/33; 521/27
(58) Field of Classification Search .............. 429/33; 521/27
See application file for complete search history.

(56) References Cited

U.S. PATENT DOCUMENTS

| 4,330,654 A | 5/1982 | Ezzell et al. |
| 4,358,545 A | 11/1982 | Ezzell et al. |
| 4,417,969 A | 11/1983 | Ezzell et al. |
| 4,433,082 A | 2/1984 | Grot |
| 4,610,762 A | 9/1986 | Birdwell |
| 4,940,525 A | 7/1990 | Ezzell et al. |
| 5,094,995 A | 3/1992 | Butt et al. |
| 5,596,676 A | 1/1997 | Swaminathan et al. |
| 2004/0247975 A1 | 12/2004 | Song et al. |

FOREIGN PATENT DOCUMENTS

| KR | 2003-0032321 | | 4/2003 |
| KR | 1020030032321 | * | 4/2003 |

OTHER PUBLICATIONS

Ramani, Vijay; Kunz, H.R.; Fenton, J.M., Stabilized composite membranes and membrane electrode assemblies for elevated temperature/low relative humidity PEFC operation, Journal of Power Sources 152(2005) 182-188.*
Korean Patent Abstract, Publication No. 1020030032321 A, Published on Apr. 26, 2003, in the name of Song.

* cited by examiner

*Primary Examiner*—Patrick Ryan
*Assistant Examiner*—Thomas H. Parsons
(74) *Attorney, Agent, or Firm*—Christie Parker & Hale LLP

(57) ABSTRACT

A polymer electrolyte membrane for a fuel cell, a method of preparing the same, and a fuel cell system comprising the same. The polymer electrolyte membrane includes a metal-bound inorganic ion-conductive salt and an ion-conductive cation exchange resin.

24 Claims, 6 Drawing Sheets

POLYMER MEMBRANE FOR A FUEL CELL, A METHOD OF PREPARING THE SAME, AND A MEMBRANE-ELECTRODE ASSEMBLY FUEL CELL SYSTEM COMPRISING THE SAME

CROSS-REFERENCE TO RELATED APPLICATION

This application claims priority to and the benefit of Korean Patent Application No. 10-2005-0054955 filed in the Korean Intellectual Property Office on Jun. 24, 2005, the entire content of which is incorporated herein by reference.

FIELD OF THE INVENTION

The invention relates to a polymer electrolyte membrane for a fuel cell, a method of preparing the same, and a fuel cell system comprising the same. More particularly, the invention relates to a polymer electrolyte membrane for a fuel cell, which is capable of operating at high temperatures, a method of preparing the same, and a fuel cell system comprising the same.

BACKGROUND OF THE INVENTION

A fuel cell is a power generation system for producing electrical energy through an electrochemical redox reaction of an oxidant and hydrogen in a hydrocarbon-based material such as methanol, ethanol, or natural gas.

Typical examples of fuel cells are polymer electrolyte membrane fuel cells (PEMFC) and direct oxidation fuel cells (DOFC). A direct oxidation fuel cell that uses methanol as a fuel is called a direct methanol fuel cell (DMFC). The polymer electrolyte membrane fuel cell is an environmentally-friendly energy source that can replace fossil fuel energy. It has several advantages such as high power output density, high energy conversion efficiency, operability at room temperature, and the capability to be down-sized and tightly sealed. Therefore, it can be widely applied to various areas such as non-polluting automobiles, residential electricity generation systems, and as portable power sources for mobile communication equipment and military equipment.

The polymer electrolyte membrane fuel cell has an advantage of having high energy density, but it also has the problems of requiring careful handling of hydrogen gas, or requiring accessory facilities such as a fuel-reforming processor for reforming a fuel gas such as methane, methanol, or natural gas to produce the hydrogen required.

In contrast, a direct oxidation fuel cell generally has lower energy density than that of a polymer electrolyte fuel cell, but it has the advantages of easy handling of the liquid-type fuel, operability at low temperatures, and does not require additional fuel-reforming processors. Therefore, such direct oxidation fuel cells may be appropriate systems for small-scale and general purpose portable power sources.

It is also highlighted as a novel portable power source because it has from four to ten times higher energy density than that of small lithium batteries.

The fuel cell has a stack formed by stacking several to a plurality of unit cells in multi-layers, which generates electricity. Here, each unit cell is made up of a membrane-electrode assembly (MEA) and a separator (also referred to as a bipolar plate).

The membrane-electrode assembly has an anode (referred to as a fuel electrode or an oxidation electrode) and a cathode (referred to as an air electrode or a reduction electrode) separated from each other by a polymer electrolyte membrane.

As for the polymer electrolyte membrane, research on a polystyrene sulfonic acid-based polymer resin has been actively performed since its initial development stage in the 1960s. In 1968, E. I. Dupont de Nemors, Inc. developed a perfluorinated sulfonic acid-based cation exchange resin (product name: NAFION®), which is reported to have much improved proton conductivity, electrochemical stability, and so on. However, since then, research has been more widely focused on the practical use of a fuel cell using NAFION®. NAFION® has hydrophobic polytetrafluoroethylene as a main chain and a functional group including a hydrophilic sulfone group at its side chain. On the other hand, a fluorine-based cation exchange resin with a similar structure to NAFION® has been developed by Asahi Chemical, Asahi Glass, Tokuyama Soda, and so on.

However, a NAFION® polymer electrolyte membrane, which has already become commercially available, has many more advantages than a hydrocarbon-based polymer electrolyte membrane in terms of oxygen solubility, electrochemical stability, durability, and the like. Since the NAFION® polymer electrolyte membrane appears to be conductive to hydrogen ions when about 20% of the polymer weight therein becomes hydrated (i.e. a sulfone group included in a pendant group is hydrolyzed into a sulfonic acid), a reaction gas used in a fuel cell must be saturated by water to hydrate the electrode membrane. However, the water gradually evaporates above its boiling point of 100° C., and accordingly the resistance of the polymer electrolyte membrane increases, deteriorating cell performance. In addition, the NAFION® polymer electrolyte membrane, which is commonly 50 to 175 μm thick, can be increased or decreased in thickness to improve the dimensional stability and mechanical properties of a fuel cell. However, when the thickness is increased, the conductivity of the polymer electrolyte membrane decreases, and when it is decreased, the mechanical properties deteriorate. When the polymer electrolyte membrane is used in a methanol fuel cell, non-reacted liquid methanol fuel passes therethrough during the cell operation (i.e., methanol crossover), thereby deteriorating cell performance as well as causing a fuel loss, because the methanol is oxidized at a cathode.

Therefore, various methods for preventing the methanol from crossing through the polymer electrolyte membrane have been recently researched and suggested. For example, a method of sputtering palladium on the surface of a polymer electrolyte membrane or forming a thin polymer layer with high resistance against methanol transmission thereon by plasma polymerization has been reported. Another method, of forming nano-sized silica ($SiO_2$) on the polymer electrolyte membrane in a sol-gel method, has also been revealed.

However, the modified polymer electrolyte membranes produced by using a sputtering and plasma method are insufficiently competitive in price. The sol-gel method of forming silica also has a problem of low productivity since it needs a great deal of washing to prevent silica from being poisoned by $Cl^-$ ions due to the reaction of the precursor of silica (tetraethoxyorthosilicate) with hydrochloric acid.

SUMMARY OF THE INVENTION

One embodiment of the invention provides a polymer electrolyte membrane for a fuel cell which can operate at a high temperature.

Another embodiment of the invention provides a method of preparing the polymer electrolyte membrane for a fuel cell.

Yet another embodiment of the invention provides a fuel cell system including the polymer electrolyte membrane for a fuel cell.

According to an embodiment of the invention, a polymer electrolyte membrane that includes a metal-bound inorganic ion-conductive salt and an ion-conductive cation exchange resin is provided.

According to another embodiment of the invention, a method of preparing the polymer electrolyte membrane is provided, which includes preparing a metal-bound inorganic ion-conductive salt by reacting a metal salt and an inorganic ion conductor in a solvent, mixing the inorganic ion-conductive salt with an ion-conductive cation polymer resin solution, and finally preparing the polymer electrolyte membrane by casting or electrospinning the mixture.

According to one embodiment of the invention, a membrane-electrode assembly is provided which includes an anode and a cathode facing in opposite directions and the polymer electrolyte membrane positioned therebetween. In an embodiment, the polymer electrolyte membrane includes a metal-bound inorganic ion-conductive salt and an ion-conductive cation exchange resin.

According to still another embodiment of the invention, a fuel cell system is provided that includes at least one electricity generating element including at least one membrane-electrode assembly, which includes an anode and a cathode positioned to face in opposite directions and a polymer electrolyte membrane interposed therebetween, and a separator, that generates electricity through the electrochemical reaction of an oxidant and a fuel, wherein a fuel supplier supplies the electricity generating element with the fuel and an oxidant supplier supplies the electricity generating element with the oxidant. In one embodiment, the polymer electrolyte membrane includes a metal-bound inorganic ion-conductive salt and an ion-conductive cation exchange resin.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings.

DETAILED DESCRIPTION

Figure 1:
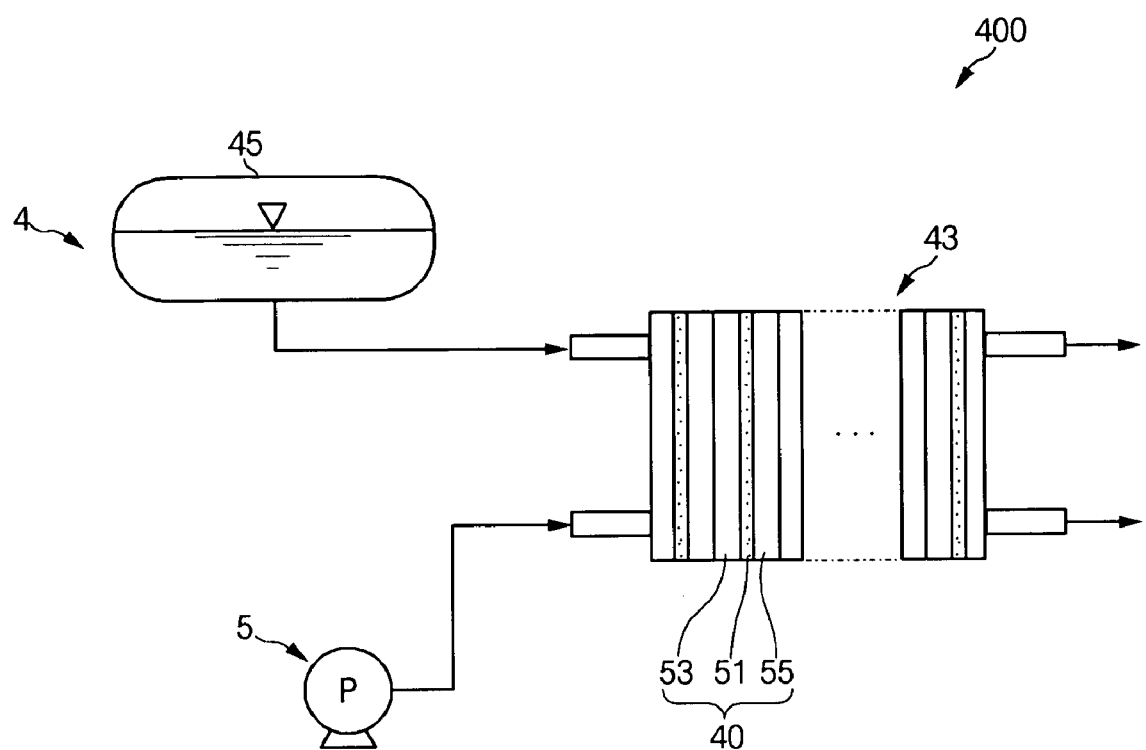
FIG. 1 is a schematic diagram showing the structure of a fuel cell system prepared according one embodiment of the invention.

In one embodiment, the invention relates to a polymer electrolyte membrane for a fuel cell, and particularly to a polymer electrolyte membrane for a fuel cell which is free from the problems of a conventional perfluorosulfonic acid resin polymer electrolyte membrane. That is, even if the conventional membrane has high proton conductivity when a sulfonic acid moiety at its side chain is dissociated by moisture, the cell performance deteriorates as the resistance of the membrane sharply increases, but conductivity decreases due to the dehydration reaction at a temperature over the boiling point, 100° C., of the moisture.

In addition, an embodiment of the invention relates to a polymer electrolyte membrane for a fuel cell that can prevent a problem of deteriorating cell performance as a hydrocarbon fuel moves toward a cathode through the polymer electrolyte membrane and is oxidized at the cathode, decreasing oxidant reduction space at the cathode, i.e., suppressing the crossover of the hydrocarbon fuel.

In one embodiment, the polymer electrolyte membrane for a fuel cell of the invention includes a metal-bound inorganic ion-conductive salt and an ion-conductive cation exchange resin.

In an embodiment, the inorganic ion-conductive salt has a fine powder shape as a hydrophilic inorganic ion conductor, and can prevent hydrogen ion conductivity from deteriorating due to evaporating moisture when the polymer electrolyte membrane operates at a temperature over 100° C. Illustrated in further detail, when the inorganic ion-conductive salt is dispersed into a composition for preparing the polymer electrolyte membrane as a powder with a diameter of about 10 to 500 nm, it can increase the space in which hydrogen ions and/or moisture can move. In addition, since the inorganic ion-conductive salt is not water-soluble, it is not dissolved by the moisture produced during the cell operation. Therefore, it can prevent the crossover of a hydrocarbon fuel, unlike a conventional water-soluble inorganic ion conductor such as phosphotungstic acid, which is dissolved by moisture produced during the cell operation and leaves the polymer electrolyte membrane with the moisture, thereby forming minute pores.

In an embodiment, non-limiting examples of the inorganic ion conductor may include at least one selected from the group consisting of phosphotungstic acid, silicotungstic acid, zirconium hydrogen phosphate, $\alpha\text{-Zr}(O_{a1}PCH_{a2}OH)_a$ $(O_{b1}PC_{b2}H_{b4}SO_{b5}H)_b \cdot nH_2O$, $\gamma\text{-Zr}(PO_{a1})(H_{a2}PO_{a3})_a$ $(HO_{b1}PC_{b2}H_{b3}SO_{b4}H)_b \cdot nH_2O$, $Zr(O_{a1}PC_{a2}H_{a3})_aY_b$, $Zr(O_{a1}PCH_{a2}OH)_aY_b \cdot nH_2O$, $\alpha\text{-Zr}(O_{a1}PC_{a2}H_{a3}SO_{a4}H)_a \cdot$ $nH_2O$, $\alpha\text{-Zr}(O_{a1}POH) \cdot H_2O$, and combinations thereof. In the above formula, a1, a2, a3, a, b1, b2, b3, b4, b5, and b are the same or different integers ranging from 0 to 14, and n is an integer ranging from 0 to 50.

A heteropolyacid compound bound with the metal works as a moisture carrier of the ion-conductive cation exchange resin at a high temperature and can improve the stability of high temperature conductivity. Consequently, since a fuel cell having a polymer electrolyte according to one embodiment of the invention can be operated at a high temperature, it can improve reaction speed. In addition, since CO is not easily bound with the catalyst at a high temperature, it can have an effect on preventing a catalyst from be poisoned by CO.

In one embodiment, the metal can include a univalent metal, for example Cs, Na, or K.

In another embodiment, a metal-bound inorganic ion-conductive salt of the invention includes an inorganic ion conductor with a metal ion substituted for a proton ion. In one embodiment, a $H^+$-inorganic ion conductor is transferred into a metal$^+$-inorganic ion-conductive salt.

In an embodiment, the metal-bound inorganic ion-conductive salt of the invention is a salt of Cs-bound phosphotungstic acid.

In an embodiment, the ion-conductive cation exchange resin includes a polymer resin containing at its side chain a cation exchange group selected from the group consisting of sulfonic acid groups, carboxylic acid groups, phosphoric acid groups, phosphonic acid groups, and derivatives thereof, and combinations thereof. The hydrogen ion conductivity of the polymer resin can be adjusted by equivalent weight, which can be obtained from an ion-exchange ratio of the ion exchange resin. Meanwhile, the "ion exchange ratio of the ion exchange resin" is determined by the number of carbons in the polymer backbone and the number of cation exchange groups. According to one embodiment of the invention, the ion exchange ratio ranges from 3 to 33. This corresponds to an equivalent weight (EW) of about 700 to 2000.

In an embodiment, non-limiting examples of the cation exchange resin include at least one hydrogen ion-conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof.

Specific examples of fluoro-based polymers include poly (perfluorosulfonic acids) of Formula 1 below ((NAFION®), E. I. Dupont de Nemours Company), Aciplex™ (Asahi Kasei Chemical), Flemion™ (Asahi Glass), and Fumion™ (commercialized as Fumatech)), fluorocarbon vinyl ethers of Formula 2 below, or vinyl ether fluorides of Formula 3 below. The polymers disclosed in U.S. Pat. Nos. 4,330,654, 4,358,545, 4,417,969, 4,610,762, 4,433,082, 5,094,995, 5,596,676, and 4,940,525 may also be used, the contents of which are hereby incorporated by reference.

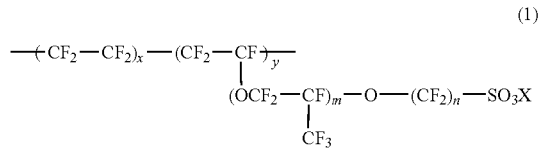

(1)

wherein in the above Formula 1, X is H, Li, Na, K, Cs, tetrabutyl ammonium, or NR1R2R3R4; R1, R2, R3, and R4 are independently selected from H, CH$_3$, and C$_2$H$_5$; m is at least 1; n is more than or equal to 2; x ranges from about 3.5 to 5; and y is more than or equal to 1000.

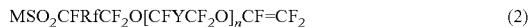

MSO$_2$CFRfCF$_2$O[CFYCF$_2$O]$_n$CF=CF$_2$   (2)

wherein in Formula 2, Rf is fluorine or a C$_1$ to C$_{10}$ perfluoroalkyl radical; Y is fluorine or a trifluoromethyl radical; n has a value from 1 to 3; and M is selected from the group consisting of fluorine, a hydroxyl radical, an amino radical, and —OMe, where Me is an alkali metal radical or a quaternary ammonium radical.

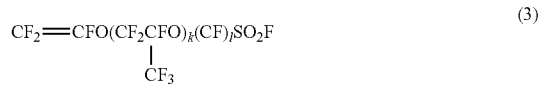

(3)

wherein in Formula 3, k is 0 or 1, and l is an integer ranging from 3 to 5.

The above structure represents poly(perfluorosulfonic acid) (product name: NAFION®), but it changes into a micelle structure when a sulfonic acid at the chain end thereof is hydrated. It acts like a typical aqueous solution acid, providing a passage through which hydrogen ions can move. When the perfluorosulfonic acid (NAFION®) is used as a cation exchange resin in the invention, in one embodiment X in the ion exchange group (—SO$_3$X) at its side chain end can be replaced with a univalent ion such as hydrogen, sodium, potassium, cesium, and the like, and tetrabutylammonium (TBA).

In an embodiment, specific examples of the benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, or polyphenylquinoxaline-based polymers include polybenzimidazole, polyimide, polysulfone, polysulfone derivatives, sulfonated poly (ether ether ketone) (s-PEEK), polyphenyleneoxides, polyphenylenesulfides, polyphosphazenes, and so on.

Alternatively, in one embodiment, an electrolyte where a polystyrenesulfonic acid polymer is grafted on polyethylene, polypropylene polymers, fluoroethylene polymers, or ethylene/tetrafluoroethylene polymers may be used.

In one embodiment, a salt of the metal-bound inorganic ion conductor is mixed with an ion-conductive cation exchange resin in a weight ratio ranging 1 to 20 based on the ion-conductive cation exchange resin. When the inorganic ion-conductive salt is mixed in a weight ratio of less than 1 based on the polymer resin, it cannot suppress the evaporation of moisture, thereby failing in maintaining conductivity. Further, when mixed in an amount of more than 20, the ductility of the polymer electrolyte membrane increases, leading to the failure of accomplishing mechanical rigidity.

Furthermore, in one embodiment, a polymer electrolyte membrane for a fuel cell of the invention can include an inorganic additive. The inorganic additive is dispersed inside the polymer electrolyte membrane with a predetermined size, further improving mechanical properties. In an embodiment, the inorganic additive can include fumed silica (product name: Aerosil, Cabo-sil, and so on), clay, alumina, mica, or zeolite (product name: SAPO-5, XSM-5, AIPO-5, VPI-5, MCM-41, and so on). Non-limiting examples of the clay include pyrophylite-talc, montmorillonite (MMT), saponite, fluorohectorite, kaolinite vermiculite, laponite, illite, mica, brittle mica, tetrasilicic mica, and so on.

According to an embodiment of the invention, the inorganic additive is added in an amount ranging from 1 to 10 parts by weight based on 100 parts by weight of the entire polymer electrolyte membrane.

In order to prepare a polymer electrolyte membrane according to one embodiment of the invention with the aforementioned structure, first, an inorganic ion-conductive salt bound with a non-water-soluble and hydrophilic metal is prepared by reacting a metal compound and an inorganic ion conductor in a solvent. Next, the prepared inorganic ion-conductive salt can be produced at higher purity by being fired at 300 to 350° C. to decompose unreacted remnants.

In an embodiment, non-limiting examples of the solvent include at least one selected from the group consisting of water, an alcohol such as methanol, ethanol, and propanol, N-methyl-2-pyrrolidinone, dimethyl formamide, dimethyl acetamide, tetrahydrofuran, dimethyl sulfoxide, acetone, methyl ethyl ketone, tetramethylurea, trimethylphosphate, butyrolactone, isophorone, carbitol acetate, methylisobutylketone, N-butyl acetate, cyclohexanone, diacetone alcohol, diisobutyl ketone, ethylacetoacetate, glycol ether, propylene carbonate, ethylene carbonate, dimethyl carbonate, diethyl carbonate, and mixtures thereof.

In an embodiment, a metal comprised in the metal compound may include Cs, Na, or K, and the compound can include carbonate, phosphate, or sulfonate.

In one embodiment, the metal compound is mixed with an inorganic ion conductor in a mixing weight ratio ranging 1:3 to 1:6.

Then, in an embodiment, an inorganic ion-conductive salt bound with the metal is mixed with a proton-conductive polymer resin solution, thereby preparing a mixture.

In an embodiment, the proton-conductive polymer resin solution is prepared by adding an ion-conductive cation polymer resin to an organic solvent. In one embodiment, the solvent can include 1-propanol, 2-propanol, ethyl alcohol, methyl alcohol, dimethylacetamide, dimethylformamide, N-methyl-2-pyrrolidinone, and mixtures thereof.

In an embodiment, a mixing ratio of the inorganic ion-conductive salt and an ion-conductive cation polymer resin solution is in the range of 1 to 20 based on the polymer resin. In one embodiment, the ion-conductive cation polymer resin solution is in a concentration ranging from 0.5 to 30 wt %.

When the polymer resin solution is in a concentration less than 0.5 wt %, the viscosity of the mixing solution becomes lower, leading an inorganic additive with high density to sink during the drying process, consequently resulting in uneven distribution thereof throughout the thickness of the membrane. Meanwhile, when the concentration is more than 30 wt %, there is the problem of extending the mixing process. In an embodiment, during the mixing process, an inorganic additive can be added. In one embodiment, the inorganic additive can be added in an amount ranging from 1 to 20 parts by weight based on 100 parts by weight of the entire mixture.

Then, in an embodiment, the mixture is cast or electrospun to prepare a polymer electrolyte membrane for a fuel cell.

In one embodiment, the casting is performed by coating the mixture on a substrate such as glass, and then drying it. In an embodiment, the drying is performed at 100 to 120° C. to evaporate the solvent. When it is dried at a temperature higher than 120° C., the solvent is evaporated too quickly, causing minute cracks on the surface of the electrolyte membrane. In one embodiment, as the solvent is evaporated at a predetermined temperature, the polymer electrolyte membrane is formed in a predetermined thickness, wherein inorganic ion conductors are uniformly distributed in a predetermined size.

According to an embodiment of the invention, a fuel cell system having the polymer electrolyte membrane includes at least one electricity generating element, a fuel supplier, and an oxidant supplier.

In one embodiment, the electricity generating element includes a membrane-electrode assembly, which includes a polymer electrolyte membrane with a cathode and an anode at respective sides thereof and separators (referred to as bipolar plates) at respective sides of the membrane-electrode assembly, and it plays a role of generating electricity through the oxidation reaction of a fuel and the reduction reaction of an oxidant.

The fuel supplier plays a role of supplying a fuel such as hydrogen to the electricity generating element, and the oxidant supplier plays a role of supplying an oxidant such as oxygen or air to the electricity generating element. In one embodiment, the fuel used in the invention is a hydrogen or hydrocarbon fuel in a liquid state. Examples of the hydrocarbon fuel include methanol, ethanol, propanol, butanol, and natural gas.

FIG. 1 is the schematic structure of a fuel cell system according to one embodiment of the invention, which will be described in details with reference to this accompanying drawing as follows. The fuel cell system 400 comprises a stack 43 having at least one electricity generating element 40 for generating electricity through the electrochemical reaction of an oxidant, a fuel supplier 4 for supplying the fuel to the electricity generating element 40, and an oxidant supplier 5 for supplying the oxidant to the electricity generating element 40.

In addition, in one embodiment, the fuel supplier 4 for supplying the fuel has a fuel tank 45 for storing the fuel.

In one embodiment, the electricity generating element 40 comprises a membrane-electrode assembly 51 for the oxidation/reduction reaction of the fuel and oxidant and separators 53 and 55 for supplying air including the fuel and oxidant to both sides of the membrane-electrode assembly 51.

Hereinafter exemplary examples and comparative examples are illustrated. However, it is understood that the following examples do not cover all possible variations and that the invention is not limited thereto.

EXAMPLE 1

A phosphotungsten acid aqueous solution was prepared by dissolving 12.0 g of phosphotungsten acid ($P_2O_5 \cdot 24WO_3 \cdot nH_2O$, PWA) particles in 50 ml of deionized water, and a $Cs_2CO_3$ aqueous solution was prepared by dissolving 2.5 g of $Cs_2CO_3$ particles in 50 ml of deionized water. Then, the $Cs_2CO_3$ aqueous solution was dripped into the phosphotungsten acid aqueous solution with the same pH level for 30 minutes and mixed together by using a magnetic agitator to lead a cation substituted reaction thereof. A $Cs^+$-phosphotungsten acid was prepared by heating of the final reactant at 300° C. for 2 hours to evaporate the deionized water, and additionally by firing it for 2 hours at 350° C. in a furnace to decompose the remaining non-reactants. The prepared $Cs^+$-phosphotungsten acid was ball-milled to have a uniform particle size.

5 wt % of a commercial NAFION®/$H_2O$/2-propanol (Solution Technology Inc., EW=1100) solution was evaporated, while being agitated, under reduced pressure at room temperature. Then, the resulting NAFION® was added to dimethylacetamide (Aldrich, DMAc) to a 5% concentration, to prepare a cation exchange resin solution (5 wt % NAFION®/DMAc) which was mechanically agitated together at 100° C. for 24 hours.

100 g of the cation exchange resin solution was mixed with 0.5 g of the $Cs^+$-phosphotungsten acid particles, agitated at 80° C. for 6 hours with a magnetic agitator, and applied with ultrasound at 80° C. for 2 hours to prepare a uniform polymer mixing solution. The polymer mixing solution was coated on a glass plate and dried at 100° C. for more than 12 hours to evaporate organic solvents, thereby preparing a polymer electrolyte membrane.

A cathode and an anode were formed by screen-printing a catalyst electrode layer comprising Pt—Ru black (not supported by a carrier, Johnson Matthey, HiSpec 6000) and Pt black (Johnson Matthey, HiSpec 1000), which were impregnated with a 5 wt % NAFION®/$H_2O$/2-propanol solution on a TEFLON (tetrafluoroethylene) film, drying it, and then hot-pressing it at 190° C. with a pressure of 200 kgf/$cm^2$ for 3 minutes to be loaded in an amount of 4 mg/$cm^2$ on the polymer electrolyte membrane.

Next, a membrane-electrode assembly was prepared by positioning and settling an ELAT electrode substrate (a gas diffusion layer) manufactured by E-Tek Co. at a cathode and anode having the polymer electrolyte membrane therebetween.

The prepared membrane-electrode assembly was interposed between gaskets, then interposed between two bipolar plates equipped with a gas flow channel and a cooling channel in a predetermined form, and pressed between copper end plates, thereby preparing a unit cell.

EXAMPLE 2

A polymer electrolyte membrane was prepared using the same method as in Example 1, except that a salt of $Cs^+$-phosphotungsten acid was prepared by respectively dissolving a phosphotungsten acid and cesium carbonate particles in 50 ml of ethanol.

EXAMPLE 3

A polymer electrolyte membrane was prepared using the same method as in Example 1, except that a salt of $Cs^+$-phosphotungsten acid was prepared by dissolving a phosphotungsten acid and cesium carbonate particles in 50 ml of methanol.

EXAMPLE 4

A polymer electrolyte membrane was prepared using the same method as in Example 1, except for using a phosphotungsten acid and sodium carbonate.

EXAMPLE 5

A polymer electrolyte membrane was prepared using the same method as in Example 1, except for using a phosphotungsten acid and calcium carbonate.

EXAMPLE 6

A polymer electrolyte membrane was prepared using the same method as in Example 1, except for using a silicontungsten acid.

EXAMPLE 7

A polymer electrolyte membrane was prepared using the same method as in Example 1, except for using zirconium hydrogen phosphate.

COMPARATIVE EXAMPLE 1

115 membranes of commercial NAFION® were respectively treated in 3%-hydrogen peroxide and 0.5M of a sulfuric acid aqueous solution at 100° C. for an hour, and then washed in deionized water at 100° C. for 1 hour.

COMPARATIVE EXAMPLE 2

A commercial 5 wt %-NAFION®/$H_2O$/2-propanol (Solution Technology Inc., EW=1,100) solution was agitated at room temperature and was evaporated under reduced pressure. The resulting NAFION® was added to Dimethylacetamide (Aldrich) to a 5 wt % concentration and mechanically agitated at 100° C. for 24 hours to prepare a cation exchange resin solution (5 wt % NAFION®/DMAc).

A polymer electrolyte membrane was prepared using the same method as in Example 1, except for adding 0.5 g of a phosphotungsten acid to 100 g of the cation exchange resin solution.

SEM Photographs

Figure 2:
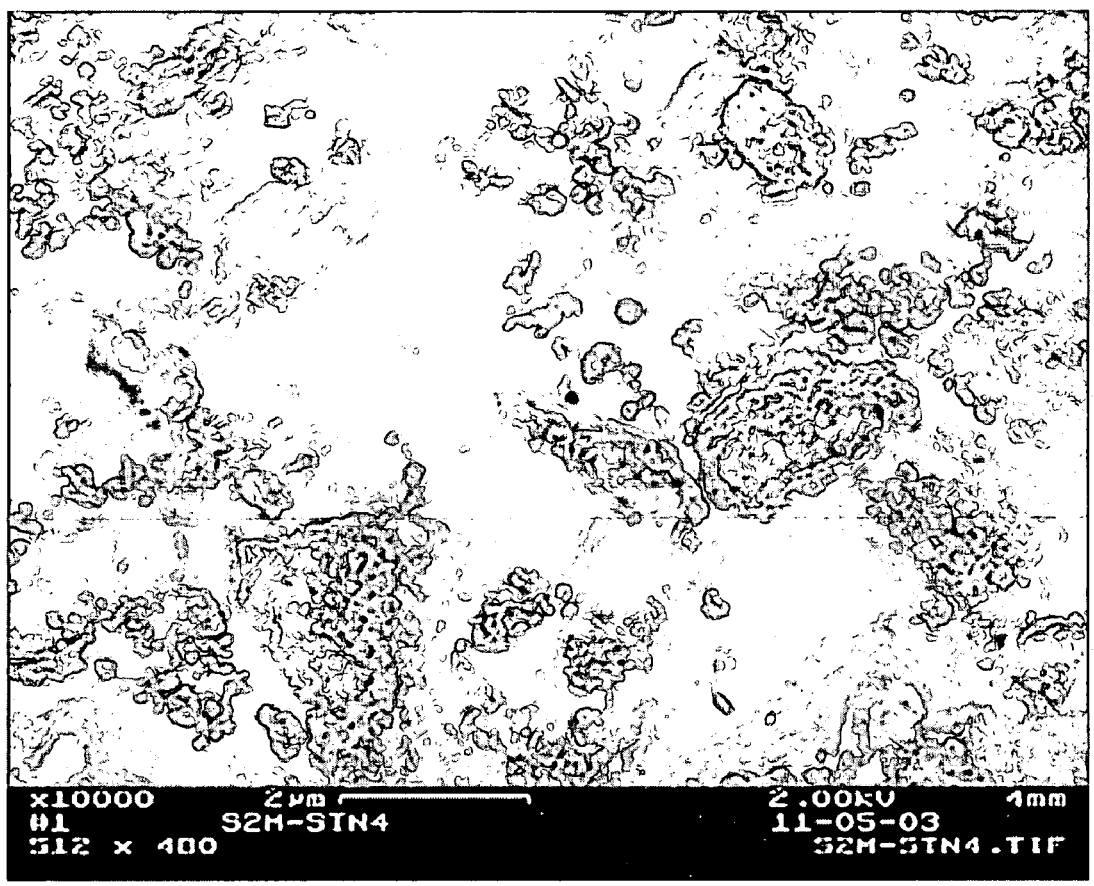
FIG. 2 is a SEM photograph of a polymer electrolyte membrane prepared according to Comparative Example 2.
Figure 3:
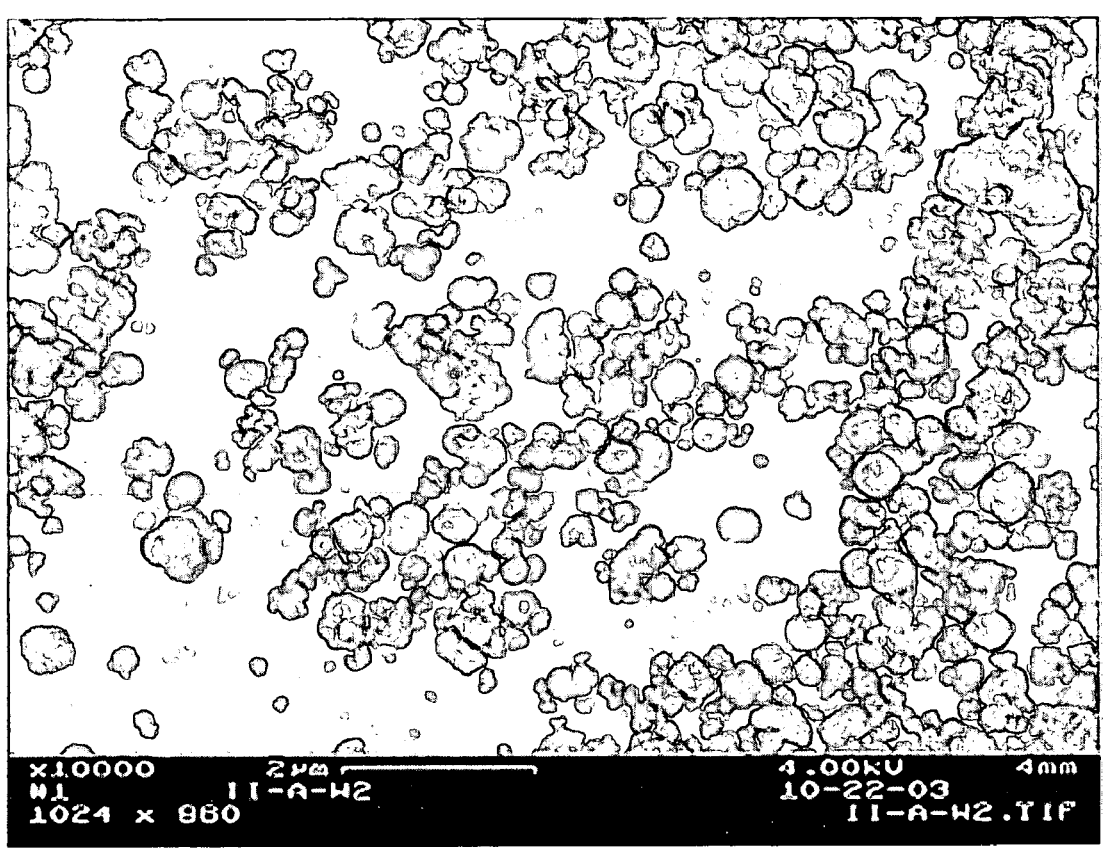
FIG. 3 is a SEM photograph of a polymer electrolyte membrane prepared according to Example 1 of the invention.

A SEM photograph of the polymer electrolyte membrane prepared according to Comparative Example 2 is provided in FIG. 2. As shown in FIG. 2, coagulations among inorganic conductor particles occurred by strong interactions in the polymer electrolyte membrane. On the contrary, as shown in a SEM photograph of the polymer electrolyte membrane prepared according to Example 1 in FIG. 3, inorganic particles with a predetermined size were uniformly distributed.

Ion Conductivity

Ion conductivity of the polymer electrolyte membranes prepared according to the Examples 1 and 2 and Comparative Example 1 was measured by using a conductivity measurement cell by BekkTech. It was also performed by measuring impedances under 100% relative humidity (RH) as the temperature changed.

Figure 4:
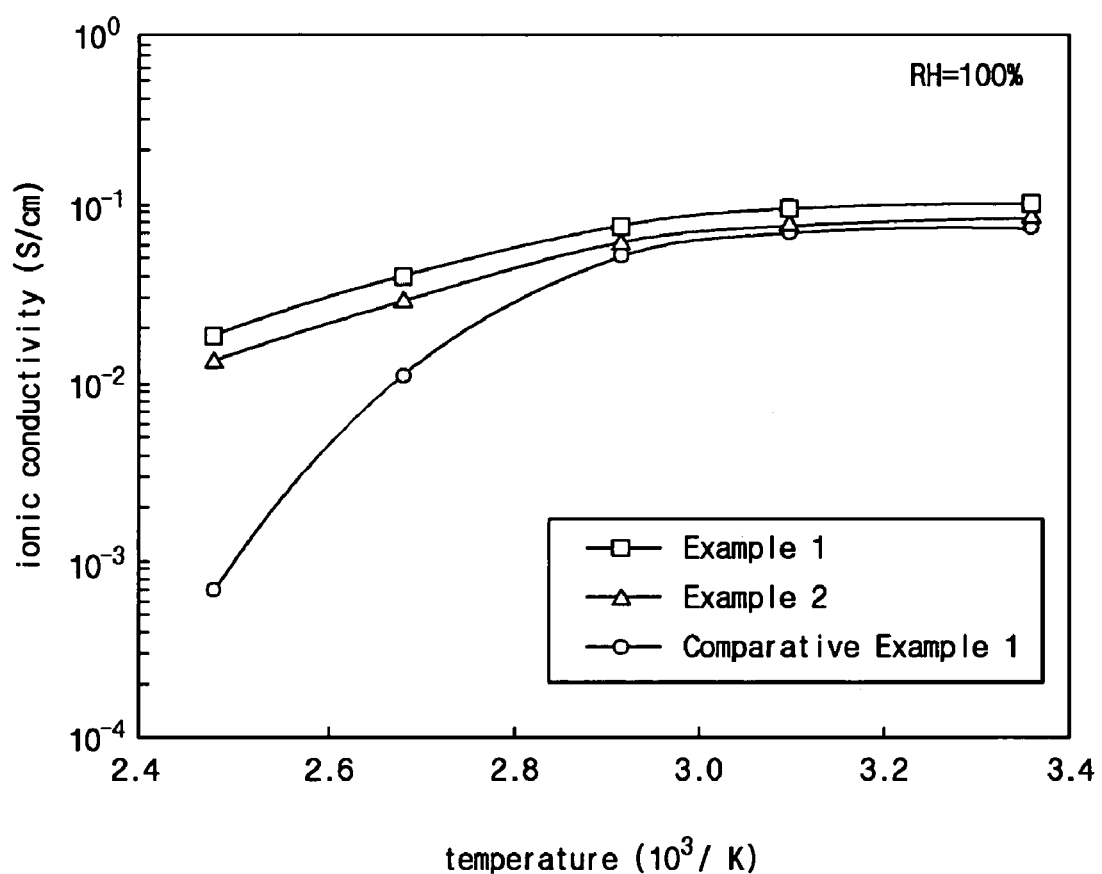
FIG. 4 is a graph illustrating conductivity change of a polymer electrolyte membrane prepared according to Examples 1 and 2 and Comparative Example 1 of the invention as the temperature thereof is changed.

The measured conductivities are provided in FIG. 4. As shown in FIG. 4, a fuel cell including the polymer electrolyte membranes prepared by Examples 1 and 2 had stable conductivity compared with Comparative Example 1 at a cell operation temperature ranging from 50 to 120° C.

Methanol Cross-over

Unit cells prepared according to Example 1 and Comparative Examples 1 and 2 were operated by flowing in 4 ml of 1M-methanol and 200 sccm (Standard Cubic Centimeter per Minute, $cm^3$/min) of nitrogen, and the methanol cross-over currents were measured at 60° C. NHE (Normal Hydrogen Electrode) of FIG. 5 means a predetermined electrochemical potential level.

Figure 5:
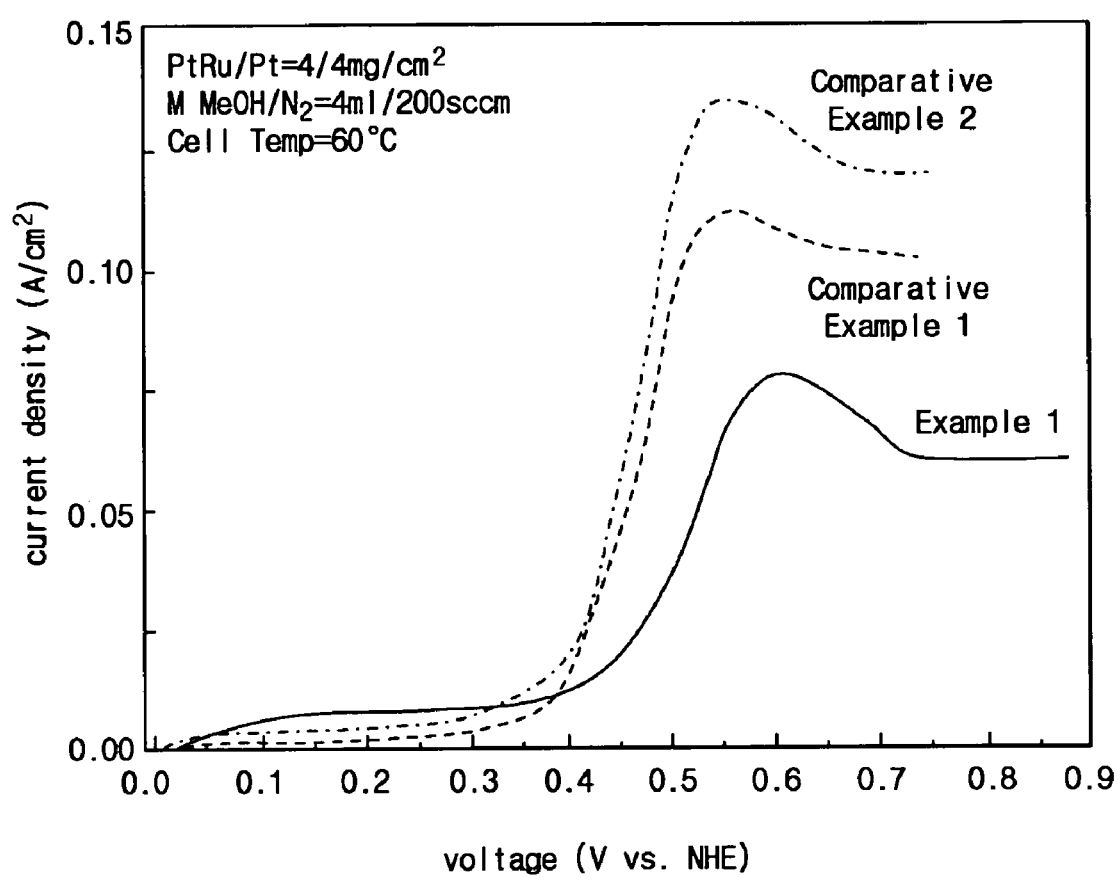
FIG. 5 is a graph illustrating the methanol cross-over current value of a polymer electrolyte membrane prepared according to Example 1 and Comparative Examples 1 and 2.

The results are provided in FIG. 5. As shown in FIG. 5, phosphotungsten acid particles of Comparative Example 2 were dissolved during the pre-treatment process of an electrolyte membrane, so that its methanol cross-over current increased, compared with 115 commercial NAFION® membranes of Comparative Example 1. On the contrary, the $Cs^+$-phosphotungsten acid salt of Example 1 shows strikingly low methanol cross-over compared with that of Comparative Example 1. As shown in FIG. 5, the y axis indicates methanol cross-over currents occurring when the methanol is not crossed over the polymer membrane toward a cathode but is all oxidized at an anode. Accordingly, bigger current values mean a greater amount of methanol cross-over.

*IV Curve

Figure 6:
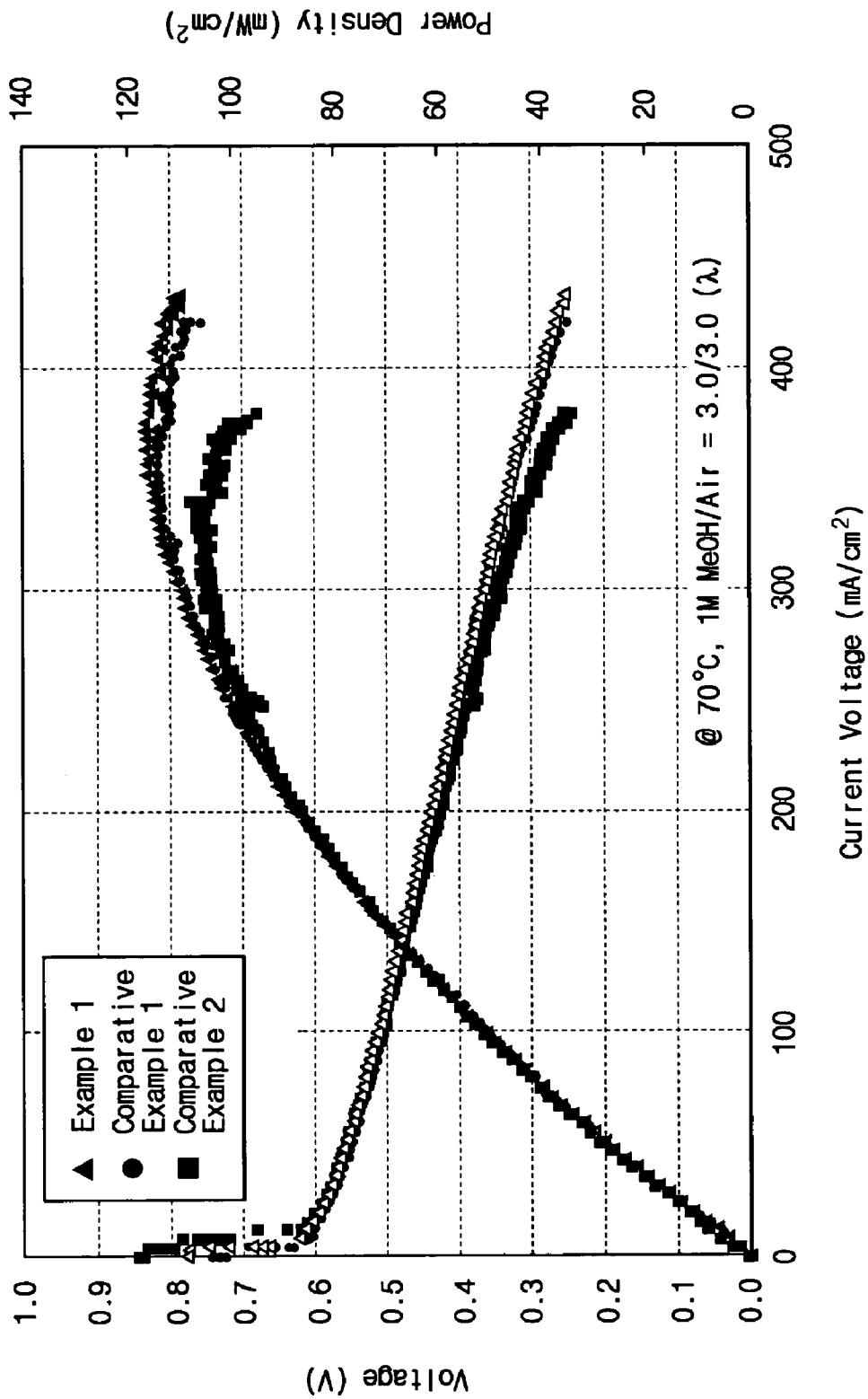
FIG. 6 is a graph illustrating power densities of cells according to Example 1 and Comparative Examples 1 and 2.

Unit cells prepared according to Example 1 and Comparative Examples 1 and 2 were operated by using an air oxidant and an 1M methanol fuel in a condition of 3 of λ (lamda, ratio of real feeding amount of fuel to theoretical feeding amount), and power densities were measured at 70° C. The results are shown in FIG. 6. As shown in FIG. 6, the cell of Example 1 exhibits better power density and good battery performances, compared to Comparative Examples 1 and 2.

As described above, since a polymer electrolyte membrane for a fuel cell of the invention can operate at a high temperature, it can improve reaction speed and also control cross-over of a hydrocarbon fuel when applied to a fuel cell.

While this invention has been described in connection with what is considered to be exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A polymer electrolyte membrane for a fuel cell, comprising:
   a metal-bound inorganic ion-conductive salt; and
   an ion-conductive cation exchange resin, wherein the metal-bound inorganic ion-conductive salt is provided in the range of from 1 to 20 parts by weight based on 100 parts by weight of the ion-conductive cation exchange resin.

2. The polymer electrolyte membrane of claim 1, wherein the metal-bound inorganic ion-conductive salt is at least one inorganic ion-conductive salt selected from the group consisting of phosphotungstic acid, silicotungstic acid, zirconium hydrogen phosphate, $\alpha\text{-}Zr(O_{a1}PCH_{a2}OH)_a(O_{b1}PC_{b2}H_{b4}SO_{b5}H)_b \cdot nH_2O$, wherein a1, a2, a, b1, b2, b4, b5, and b are the same or different from each other and are integers of 0 to 14, and n is an integer of 0 to 50, $\nu\text{-}Zr(PO_{a1})(H_{a2}PO_{a3})_a(HO_{b1}PC_{b2}H_{b3}SO_{b4}H)_b \cdot nH_2O$, wherein a1, a2, a3, a, b1, b2, b3, b4, and b are the same or different from each other and are integers of 0 to 14, and n is an integer of 0 to 50, $Zr(O_{a1}PC_{a2}H_{a3})_aY_b$, wherein a1, a2, a3, a, and b are the same or different from each other and are integers of 0 to 14, $Zr(O_{a1}PCH_{a2}OH)_aY_b \cdot nH_2O$, wherein a1, a2, a, and b are the same or different from each other and are integers of 0 to 14, and n is an integer of 0 to 50, $\alpha\text{-}Zr(O_{a1}PC_{a2}H_{a3}SO_{a4}H)_a \cdot nH_2O$, wherein a1, a2, a3, a4, and a are the same or different from each other and are integers of 0 to 14, and n is an integer of 0 to 50, $\alpha\text{-}Zr(O_{a1}POH) \cdot H_2O$, wherein a1 is an integer of 0 to 14, and combinations thereof.

3. The polymer electrolyte membrane of claim 2, wherein the metal-bound inorganic ion-conductive salt is a salt of Cs-bound phosphotungstic acid.

4. The polymer electrolyte membrane of claim 1, wherein the metal is a univalent metal.

5. The polymer electrolyte membrane of claim 4, wherein the metal is selected from the group consisting of Cs, Na, K, and combinations thereof.

6. The polymer electrolyte membrane of claim 1, wherein the ion-conductive cation exchange resin is a polymer resin having a cation exchange group selected from the groups consisting of sulfonic acid groups, carboxylic acid groups, phosphoric acid groups, phosphonic acid groups, derivatives thereof, and combinations thereof.

7. The polymer electrolyte membrane of claim 1, wherein the ion-conductive cation exchange resin has an ion-exchange ratio in the range of 3 to 33 and an equivalent weight in the range of 700 to 2000.

8. The polymer electrolyte membrane of claim 1, wherein the ion-conductive cation exchange resin is selected from the group consisting of perfluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof.

9. The polymer electrolyte membrane of claim 1, further comprising an inorganic additive.

10. The polymer electrolyte membrane of claim 9, wherein the inorganic additive is selected from the group consisting of silica, clay, alumina, mica, zeolite, and combinations thereof.

11. The polymer electrolyte membrane of claim 9, wherein the inorganic additive is included in an amount in the range of 1 to 10 parts by weight based on 100 parts by weight of the entire polymer electrolyte membrane.

12. A fuel cell system comprising at least one electricity generating element comprising:
   at least one membrane-electrode assembly comprising an anode and a cathode positioned on opposite sides of a polymer electrolyte membrane that is interposed therebetween, wherein the polymer electrolyte membrane comprises a metal-bound inorganic ion-conductive salt and an ion-conductive cation exchange resin, and the metal-bound inorganic ion-conductive salt is provided in the range of from 1 to 20 parts by weight based on 100 parts by weight of the ion-conductive cation exchange resin;
   separators on opposite sides of the polymer electrolyte membrane for generating electricity through an oxidation reaction of a fuel and a reduction reaction of an oxidant;
   a fuel supplier for supplying the fuel to the electricity generating element; and
   an oxidant supplier for supplying the oxidant to the electricity generating element.

13. The fuel cell system of claim 12, wherein the metal-bound inorganic ion-conductive salt is at least one selected from the group consisting of phosphotungstic acid, silicotungstic acid, zirconium hydrogen phosphate, $\alpha\text{-}Zr(O_{a1}PCH_{a2}OH)_a(O_{b1}PC_{b2}H_{b4}SO_{b5}H)_b \cdot nH_2O$, wherein a1, a2, a, b1, b2, b4, b5, and b are the same or different from each other and are integers of 0 to 14, and n is an integer of 0 to 50, $\nu\text{-}Zr(PO_{a1})(H_{a2}PO_{a3})_a(HO_{b1}PC_{b2}H_{b3}SO_{b4}H)_b \cdot nH_2O$, wherein a1, a2, a3, a, b1, b2, b3, b4, and b are the same or different from each other and are integers of 0 to 14, and n is an integer of 0 to 50, $Zr(O_{a1}PC_{a2}H_{a3})_aY_b$, wherein a1, a2, a3, a, and b are the same or different from each other and are integers of 0 to 14, $Zr(O_{a1}PCH_{a2}OH)_aY_b \cdot nH_2O$, wherein a1, a2, a, and b are the same or different from each other and are integers of 0 to 14, and n is an integer of 0 to 50, $\alpha\text{-}Zr(O_{a1}PC_{a2}H_{a3}SO_{a4}H)_a \cdot nH_2O$, wherein a1, a2, a3, a4, and a are the same or different from each other and are integers of 0 to 14, and n is an integer of 0 to 50 and $\alpha\text{-}Zr(O_{a1}POH) \cdot H_2O$, wherein a1 is an integer of 0 to 14, and combinations thereof.

14. The fuel cell system of claim 13, wherein the metal-bound inorganic ion-conductive salt is a Cs-bound phosphotungstic acid salt.

15. The fuel cell system of claim 12, wherein the metal is a univalent metal.

16. The fuel cell system of claim 15, wherein the metal is selected from the group consisting of Cs, Na, K, and combinations thereof.

17. The fuel cell system of claim 12, wherein the ion-conductive cation exchange resin has a cation exchange group selected from the group consisting of sulfonic acid groups, carboxylic acid groups, phosphoric acid groups, phosphonic acid groups, derivatives thereof, and combinations thereof.

18. The fuel cell system of claim 12, wherein the ion-conductive cation exchange resin has an ion-exchange ratio in the range of 3 to 33 and an equivalent weight in the range of 700 to 2000.

19. The fuel cell system of claim 12, wherein the ion-conductive cation exchange resin is selected from the group consisting of perfluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof.

20. The fuel cell system of claim 12, wherein the inorganic ion-conductive salt bound with the metal has a ratio in the range of 1 to 20 parts by weight based on 100 parts by weight of the ion-conductive cation exchange resin.

21. The fuel cell system of claim 12, wherein the polymer electrolyte membrane further comprises an inorganic additive.

22. The fuel cell system of claim 21, wherein the inorganic additive is selected from the group consisting of silica, clay, alumina, mica, zeolite, and combinations thereof.

23. The fuel cell system of claim 21, wherein the inorganic additive is added in a ratio in the range of 1 to 10 parts by weight based on 100 parts by weight of the entire amount of the polymer electrolyte membrane.

24. A polymer electrolyte membrane for a fuel cell, comprising:
a metal-bound inorganic ion-conductive salt comprising a metal compound and an inorganic ion conductor provided in a weight ratio ranging from 1:3 to 1:6; and
an ion-conductive cation exchange resin.

* * * * *